US012720328B2

(12) United States Patent
Yang et al.

(10) Patent No.: US 12,720,328 B2
(45) Date of Patent: Aug. 25, 2026

(54) SIMULATING WIRELESS NETWORKS USING MULTILAYER RADIO FREQUENCY RESOLUTION MAPS

(71) Applicant: Verizon Patent and Licensing Inc., Basking Ridge, NJ (US)

(72) Inventors: Xiong Yang, Berkeley Heights, NJ (US); Mourad B. Takla, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 566 days.

(21) Appl. No.: 17/672,754

(22) Filed: Feb. 16, 2022

(65) Prior Publication Data

US 2023/0262477 A1 Aug. 17, 2023

(51) Int. Cl.

| | |
|---|---|
| ***H04W 16/10*** | (2009.01) |
| ***H04W 8/02*** | (2009.01) |
| ***H04W 16/18*** | (2009.01) |
| ***H04W 16/22*** | (2009.01) |
| ***H04W 24/02*** | (2009.01) |
| ***H04W 48/16*** | (2009.01) |

(52) U.S. Cl.

CPC ............. *H04W 16/22* (2013.01); *H04W 8/02* (2013.01); *H04W 48/16* (2013.01)

(58) Field of Classification Search

CPC ..... H04W 16/18; H04W 16/20; H04W 16/22; H04W 8/02; H04W 8/08; H04W 8/16; H04W 48/04; H04W 48/06; H04W 48/16; H04W 24/02; H04W 24/08; H04W 24/10; G01S 17/06; G01S 17/52; G01S 17/58; G01S 17/88; G01S 17/89; H04L 43/045; H04L 43/06; H04L 43/065; G05D 1/0212; G05D 1/0274

See application file for complete search history.

(56) References Cited

U.S. PATENT DOCUMENTS

| | | | | | |
|---|---|---|---|---|---|
| 7,379,740 | B2 * | 5/2008 | Da Torre | H04W 16/22 | 455/445 |
| 11,675,355 | B2 * | 6/2023 | Lee | G01C 21/32 | 701/25 |
| 2004/0152480 | A1 * | 8/2004 | Willars | H04W 36/0061 | 455/513 |
| 2007/0219708 | A1 * | 9/2007 | Brasche | H04W 4/029 | 701/457 |

(Continued)

*Primary Examiner* — Moo Jeong
*Assistant Examiner* — Scott A Schlack

(57) ABSTRACT

One or more computing devices, systems, and/or methods for simulating wireless networks using multilayer radio frequency resolution maps are provided. A set of resolution maps are selected from a plurality of resolution maps based upon the set of resolution maps corresponding to a speed of emulated user equipment traveling during a simulation of a wireless network or a radio frequency used by the emulated user equipment. A geographical location of the emulated user equipment in a geographical map is translated to a grid location in the set of resolution maps. The emulated user equipment is provided with a cell list at the grid location and signal strengths derived from the set of resolution maps at a given radio frequency and the speed. The emulated user equipment utilizes the cell list and the signal strengths to select and connect to a cell site within the cell list.

20 Claims, 10 Drawing Sheets

(56) References Cited

U.S. PATENT DOCUMENTS

| | | | | |
|---|---|---|---|---|
| 2009/0063042 | A1* | 3/2009 | Santesson | G01C 21/3889 701/533 |
| 2010/0305931 | A1* | 12/2010 | Fordham | H04W 16/18 703/13 |
| 2014/0045494 | A1* | 2/2014 | Pekonen | H04W 36/0061 455/437 |
| 2014/0323153 | A1* | 10/2014 | Xiao | G01S 5/02521 455/456.2 |
| 2015/0282182 | A1* | 10/2015 | Oyama | H04W 72/0453 370/329 |
| 2015/0302123 | A1* | 10/2015 | Gloss | H04L 43/045 703/13 |
| 2020/0003901 | A1* | 1/2020 | Shroff | G06T 17/20 |
| 2023/0062443 | A1* | 3/2023 | Chakraborty | H04W 24/04 |
| 2023/0224055 | A1* | 7/2023 | Ramiro Moreno | H04B 17/373 370/252 |
| 2023/0232271 | A1* | 7/2023 | Kawai | H04W 4/44 370/329 |
| 2023/0268964 | A1* | 8/2023 | Hadani | H04B 7/063 375/262 |
| 2024/0284291 | A1* | 8/2024 | Muraoka | H04W 36/324 |

* cited by examiner

SELECT SET OF RESOLUTION MAPS FROM PLURALITY OF RESOLUTION MAPS — 202

TRANSLATE GEOGRAPHICAL LOCATION OF EMULATED USER EQUIPMENT TO GRID LOCATION IN SET OF RESOLUTION MAPS — 204

PROVIDE EMULATED USER EQUIPMENT WITH CELL LIST AND SIGNAL STRENGTHS — 206

UTILIZE CELL LIST AND SIGNAL STRENGTHS TO SELECT AND CONNECT TO CELL SITE WITHIN CELL LIST — 208

SIMULATING WIRELESS NETWORKS USING MULTILAYER RADIO FREQUENCY RESOLUTION MAPS

BACKGROUND

A wireless network may comprise a variety of network components that enable communication devices, such as user equipment, to communicate over the wireless network. For example, the wireless network may comprise base stations (e.g., a gNodeB base station, an eNodeB base station, etc.), baseband units, core network components, antennas, repeaters, switches, radio access network (RAN) controllers, etc. Deployment and optimal configuration of network components of the wireless network is complex due to the vast amount of network components that are installed across a large area. Various factors can affect performance, such as a radio frequency used by user equipment to communicate with a base station, radio frequency propagation characteristics of a particular location (e.g., signal propagation in an open area vs inside a tunnel), signal strength, speed of the user equipment (e.g., a pedestrian walking with a phone compared with a user driving with a phone on the highway), etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

Figure 1:
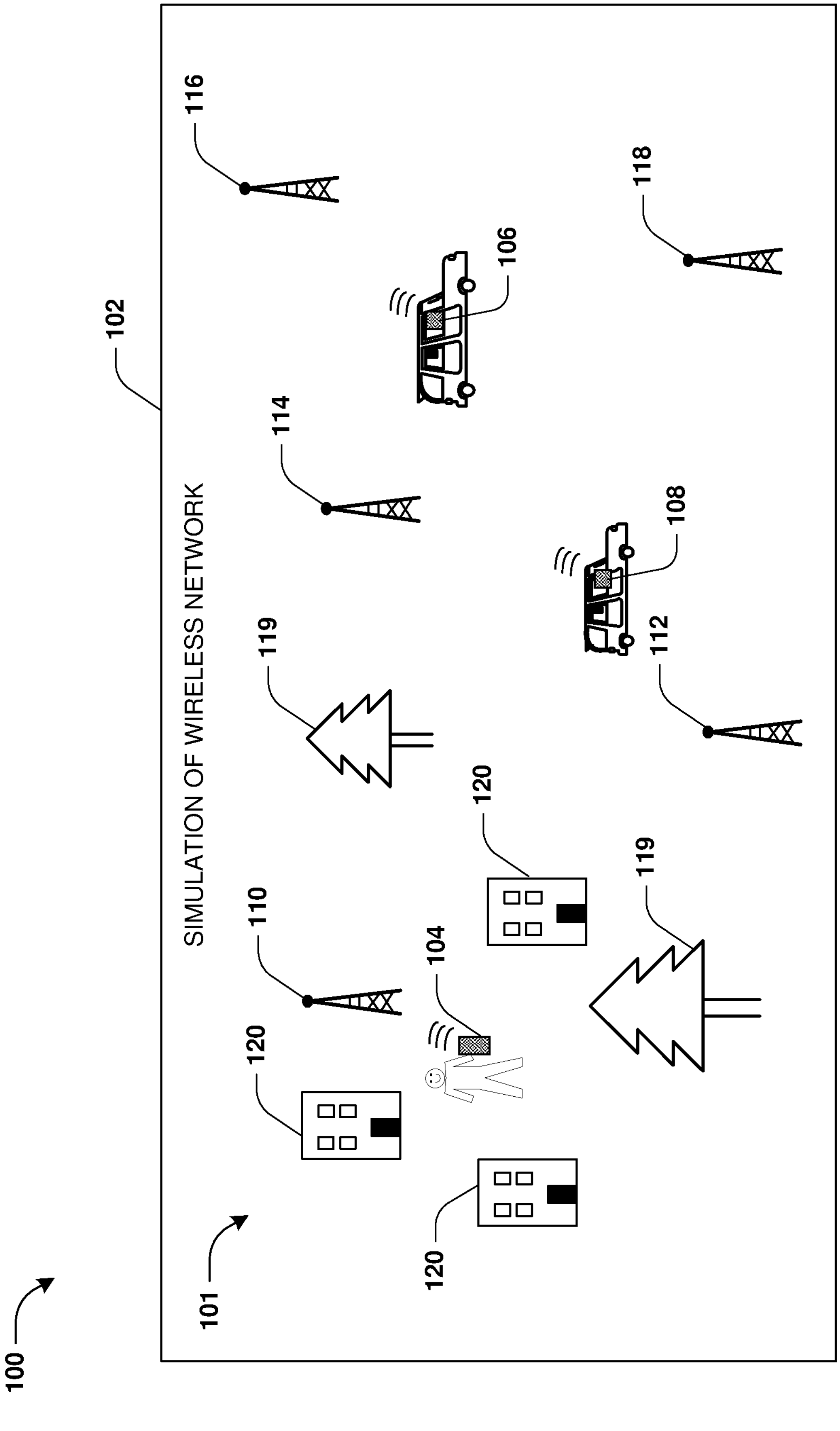
FIG. 1 is a diagram illustrating an example scenario associated with simulating wireless networks using multilayer radio frequency resolution maps.

One or more systems and/or techniques for simulating wireless networks using multilayer radio frequency resolution maps are provided. Before deploying and configuration network components of a wireless network, it may be advantageous to identify optimal installation locations, configuration parameters, and/or predicted performance given certain scenarios (e.g., network performance of a phone while using various radio frequencies and while traveling at different speeds). These installation locations, configuration parameters, and predicted performance may be modeled and calculated through a simulation 102 of the wireless network, as illustrated by FIG. 1.

The simulation 102 may correspond to a location 101 that includes buildings 120 within a downtown area, trees 119, a highway, cell sites, user equipment, and/or other objects and network components. For example, the location 101 may include a first cell site 110, a second cell site 112, a third cell site 114, a fourth cell site 116, and a fifth cell site 118 that are modeled in the simulation 102 of the wireless network. It may be appreciated that a variety of other network components may be modeled through the simulation 102 of the wireless network, such as base stations (e.g., a gNodeB base station, an eNodeB base station, etc.), baseband units, core network components, antennas, repeaters, switches, radio access network (RAN) controllers, various types of user equipment, etc. A first user equipment 104 of a pedestrian walking through the downtown area, a second user equipment 106 of a driver of a vehicle driving along the highway, and a third user equipment 108 of a driver of a vehicle driving along the highway may be modeled through the simulation 102 of the wireless network. It may be appreciated that a variety of user equipment may be modeled within the simulation 102 of the wireless network, such as smart devices, mobile devices, tablets, vehicle computing devices, and/or a variety of other devices with cellular or other types of wireless communication functionality.

The simulation 102 of the wireless network may be used to identify configuration parameters for the user equipment and/or network components. The configuration parameters may correspond to radio frequencies to utilize for communication between the user equipment and the cell sites, cell sites to use based upon a current location and travel speed of the user equipment (e.g., for improved signal strength, communication speed, reduced power, etc.), configuration parameters for the cell sites, etc. The travel speed, current location, surrounding objects that could obstruct signals, locations of nearby cell sites, radio frequencies used for communication transmission, and/or a variety of other factors can affect the signal strength, quality and communication speed of user equipment within the location 101. These factors may be simulated through the simulation 102 of the wireless network. In order to accurately simulate the wireless network, radio frequency conditions that are reflective of what user equipment and network components will experience needs to be taken into account. These radio frequency conditions can be affected by the travel speed, current location, surrounding objects, locations of nearby cell sites, radio frequencies used for communication transmission, and other factors. For example, communication signals of user equipment will experience different radio frequency propagation if the user equipment is traveling along the highway, if the user equipment is being carried around at walking speed by a pedestrian, if the user equipment is within a building, if a tree 119 or building 120 is between the user equipment and a cell site, what radio frequency is being used for communication, etc.

In order to apply radio frequency conditions to the simulation 102 of the wireless network, a radio frequency map may be created for the location 101. The radio frequency map describes radio frequency propagation for the location. The radio frequency map may be divided into grid locations (regions) that each represent fixed radio frequency conditions at a particular grid location. The radio frequency map may describe radio frequency conditions that include various radio frequency signals from different cell sites deployed within a surrounding area such that signals from these cell sites will be received by user equipment within the grid location. Unfortunately, utilizing a single radio frequency map for the location 101 does not take into account the various factors that can affect radio frequency conditions and propagation due to varying conditions at different regions within the location 101. For example, the first user equipment 104 of the pedestrian walking through the downtown area will experience different radio frequency conditions and propagation characteristics than the second user equipment 106 and the third user equipment 108 traveling within the vehicles. This is because the first user equipment 104 is traveling at a much slower speed than the second user equipment 106 and the third user equipment 108. Also, different user equipment may utilize different frequencies for communication (e.g., propagation and multi-path fading of millimeter waves is different than low frequency waves such as waves between 800 Hz and 2 GHz), which can result in different radio frequency conditions and propagation.

Accordingly, as provided herein, multi-resolution maps may be defined and used for the simulation 102 of the wireless network, such as for the location 101. The multi-resolution maps are defined as a set of resolution maps that each corresponds to different factors that can affect radio frequency propagation, and thus each resolution map more accurately describes radio frequency propagation for a particular factor or set of factors. In some embodiments, each resolution map may correspond to a different user equipment speed because different user equipment speeds can affect radio frequency propagation differently. In some embodiments, each resolution map may correspond to a different radio frequency because different radio frequencies can affect radio frequency propagation differently. In this way, each resolution map may be tailored for certain conditions so that a particular resolution map may be selected and applied for a particular scenario, such as the first user equipment 104 moving at walking speed, the second user equipment 106 moving at highway speed, the third user equipment 108 utilizing a particular radio frequency to communicate with an emulated distributed unit of a cell site, etc. This improves the accuracy of the simulation 102 of the wireless network so that more precise configuration parameters, installation locations, and predicted performance can be determined. Also, more accurate simulation results can be used to generate and transmit commands to real-world user equipment and/or network components to improve operation of such devices (e.g., modify a radio frequency being used for improved signal strength, reduced power consumption, etc.).

Figure 2:
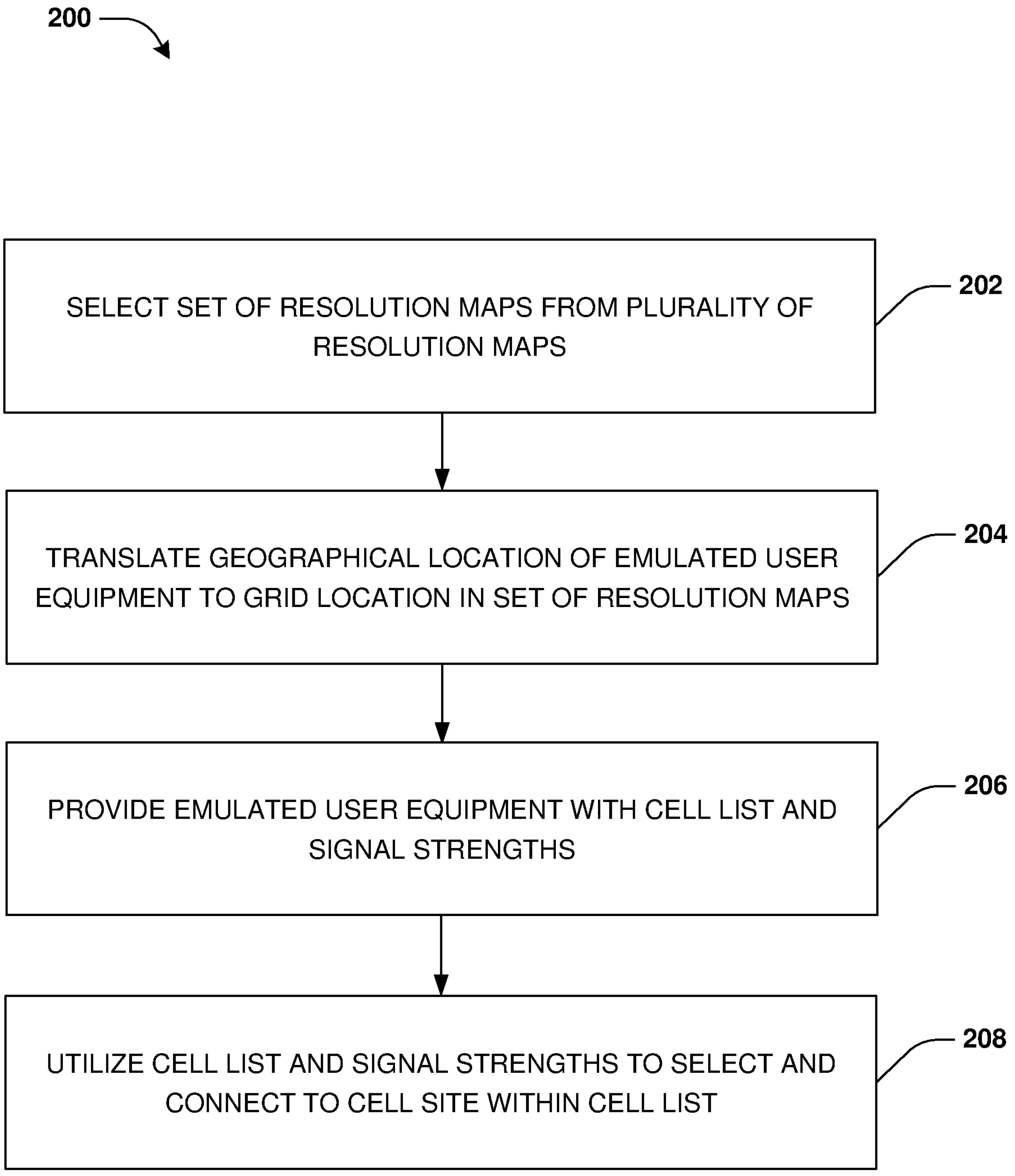
FIG. 2 is a flow chart illustrating an example method for simulating wireless networks using multilayer radio frequency resolution maps.
Figure 3:
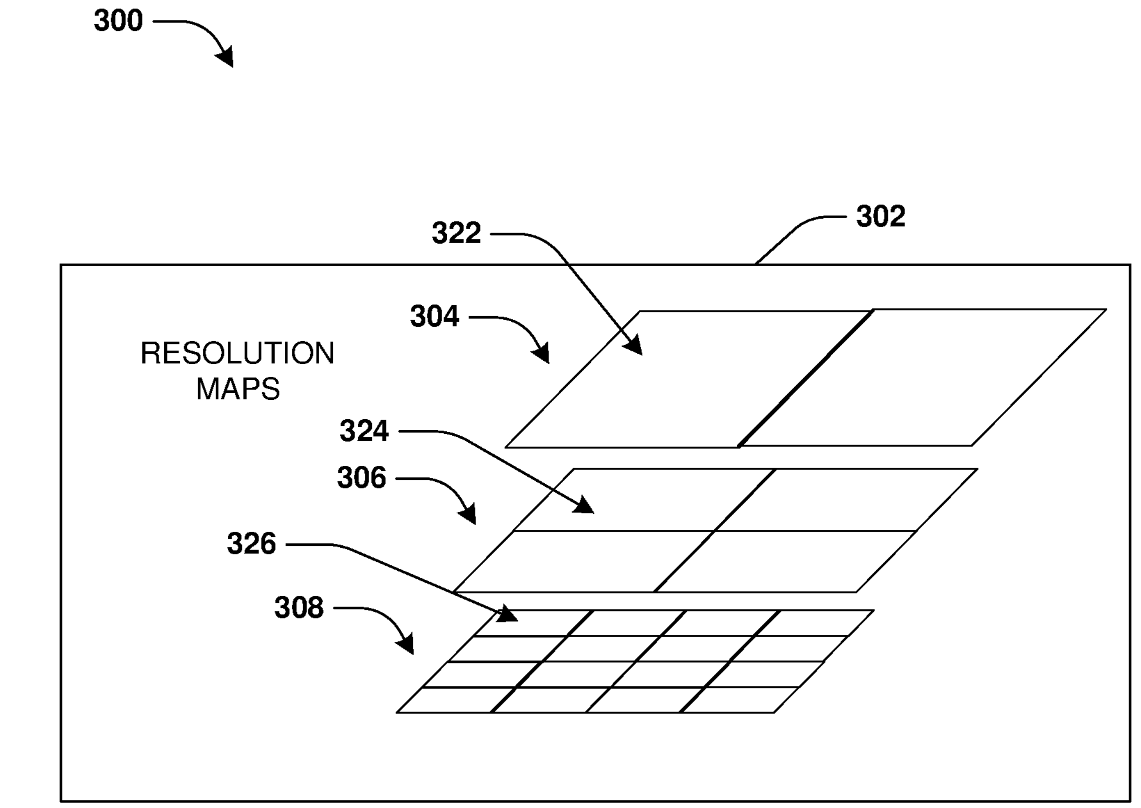
FIG. 3 is a diagram illustrating an example scenario associated with simulating wireless networks using multilayer radio frequency resolution maps.
Figure 3:
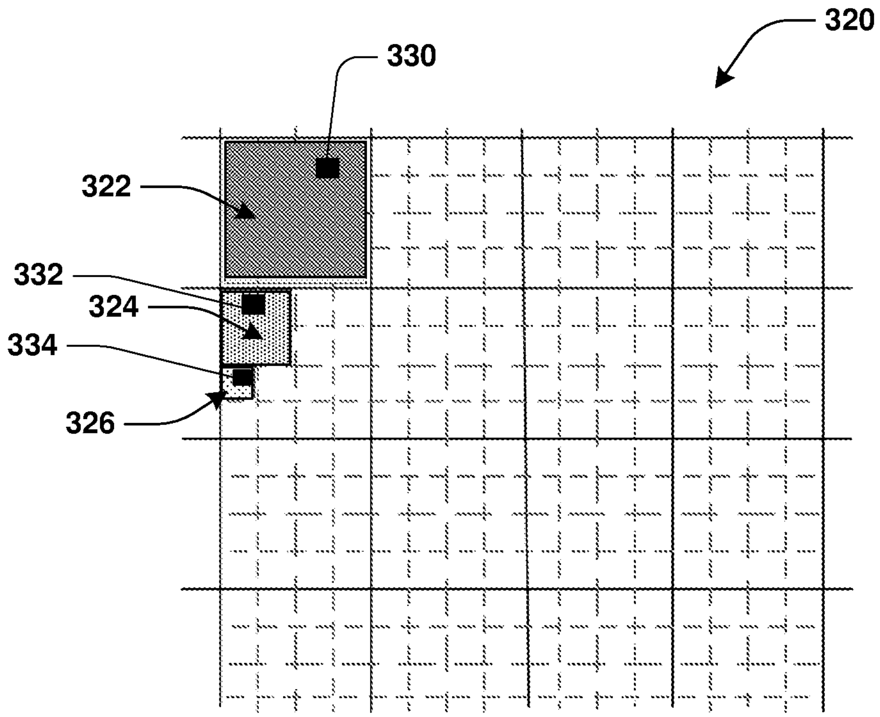
Figure 4A:
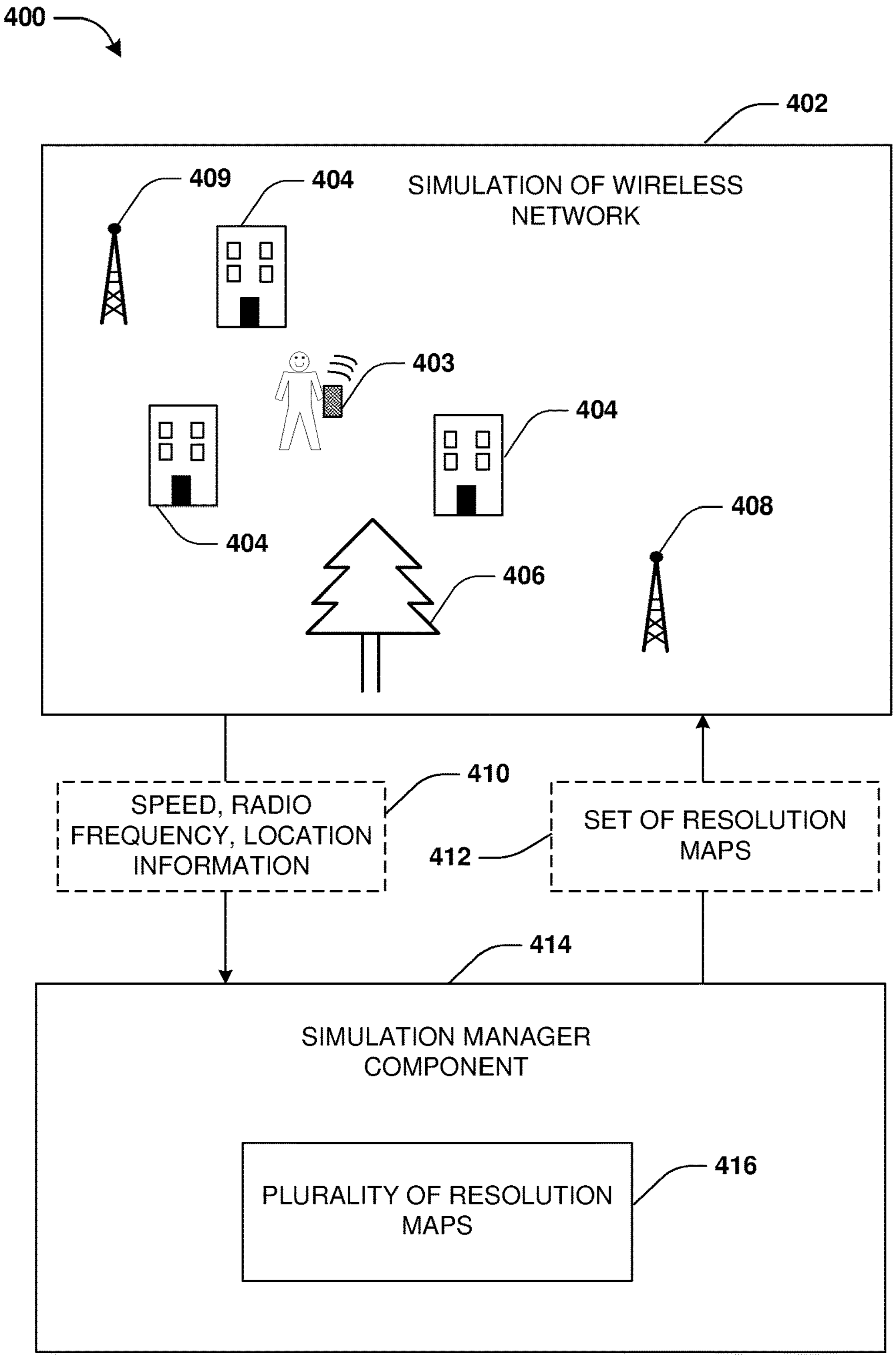
FIG. 4A is a diagram illustrating an example scenario associated with simulating wireless networks using multilayer radio frequency resolution maps.
Figure 4B:
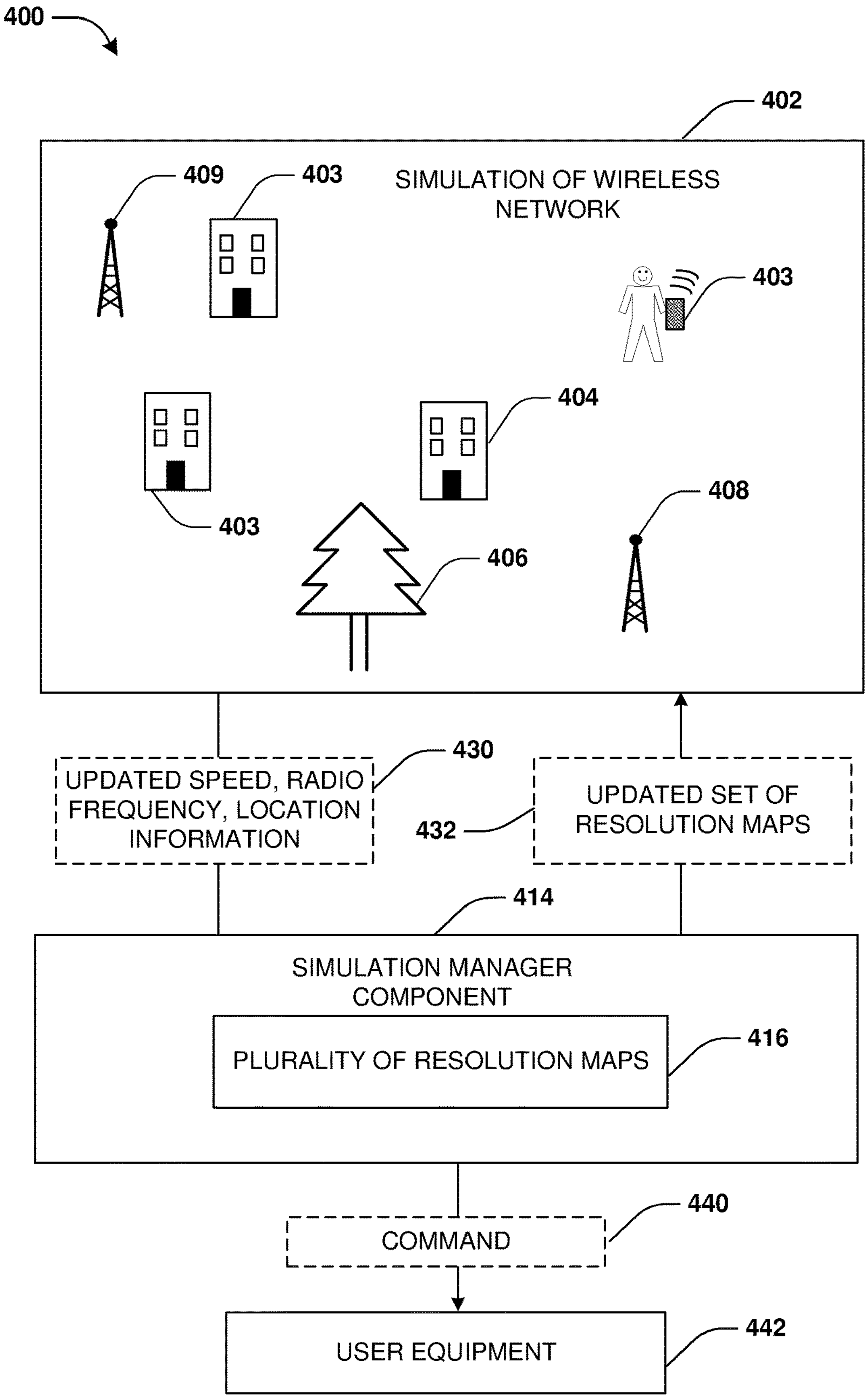
FIG. 4B is a diagram illustrating an example scenario associated with simulating wireless networks using multilayer radio frequency resolution maps, where movement of user equipment is taken into account.
Figure 5A:
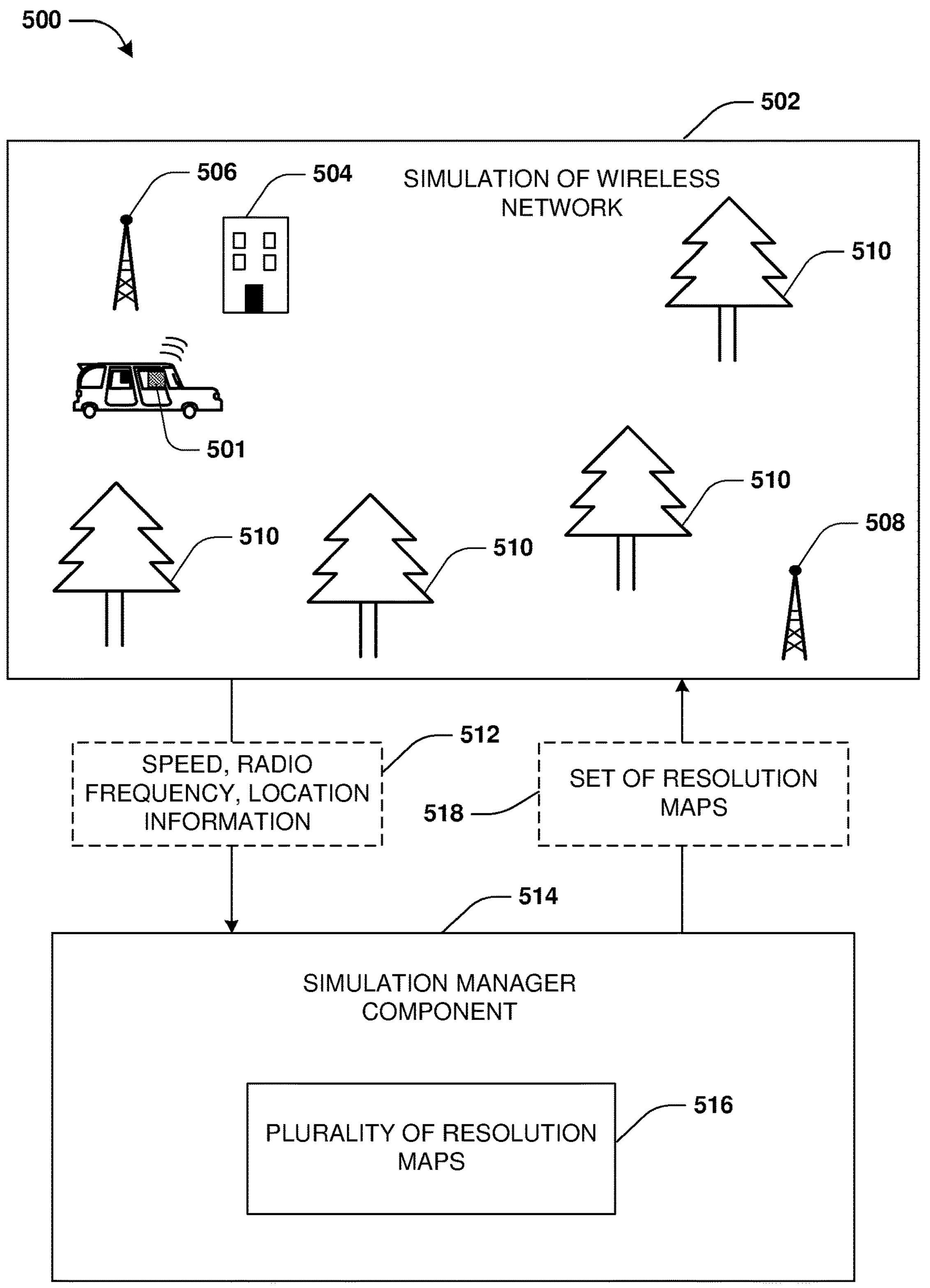
FIG. 5A is a diagram illustrating an example scenario associated with simulating wireless networks using multilayer radio frequency resolution maps.
Figure 5B:
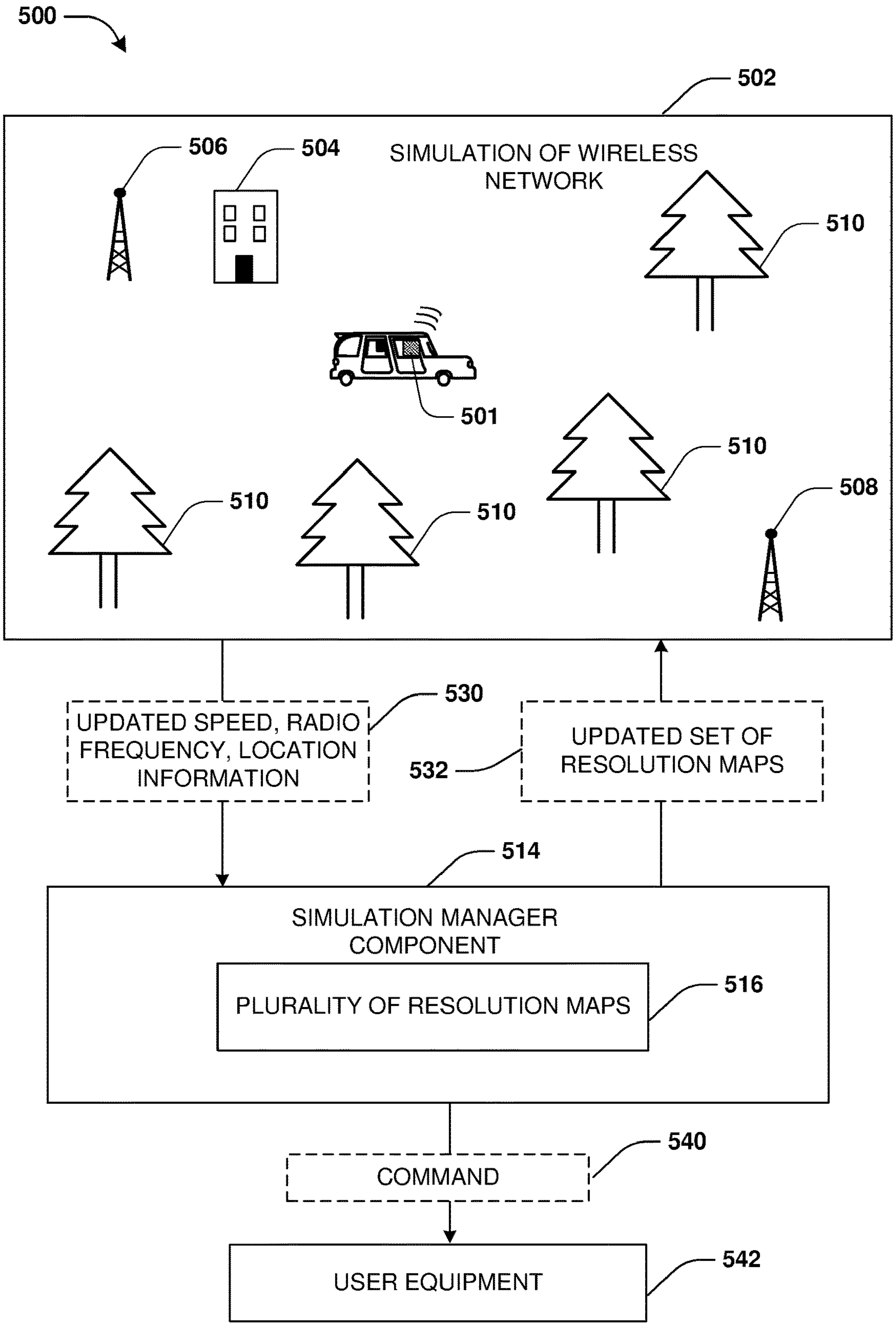
FIG. 5B is a diagram illustrating an example scenario associated with simulating wireless networks using multilayer radio frequency resolution maps, where movement of user equipment is taken into account.

FIG. 2 illustrates an example of a method 200 for simulating wireless networks using multilayer radio frequency resolution maps, which is further described in conjunction with system 300 of FIG. 3, system 400 of FIGS. 4A and 4B, and system 500 of FIGS. 5A and 5B. A wireless network may be simulated in order to identify configuration parameters, installation locations, and predicted performance of user equipment and/or network components within a location. The simulation may be performed using a plurality of resolution maps 302. In some embodiments, each resolution map may correspond to a different radio frequency so that multiple different radio frequency scenarios may be simultaneously simulated during the simulation. For example, a first resolution map for a first radio frequency may be applied to first user equipment while a second resolution map for a second radio frequency may be applied to second user equipment during the simulation. The plurality of resolution maps 302 may comprise maps at various resolutions (e.g., region sizes). For example, there may be 2 resolution maps at a first resolution 304 (a large region size) that cover a location 320 being simulated. There may be 4 resolution maps at a second resolution 306 (a medium region size) that cover the location 320 being simulated. There may be 16 resolution maps at a third resolution 308 (a small region size) that cover the location 320 being simulated.

In some embodiments, one or more of the resolution maps may overlap, such as where one resolution map at the first resolution 304 overlaps 2 of the resolution maps at the second resolution 306 and overlaps 8 of the resolution maps at the third resolution 308. When multiple resolution maps (e.g., at different resolutions) overlap, the information (e.g., radio frequency propagation information) of each resolution map is maintained separate so that information of a select resolution map may be selected and applied to the simulation 402 based upon the resolution map corresponding to certain selection criteria/conditions (e.g., matching a radio frequency or user equipment speed of user equipment).

A resolution map at a particular resolution (region size) may be selected for simulating radio frequency propagation based upon various factors (criteria/conditions), such as a location of user equipment, a user equipment speed of the user equipment, a radio frequency that the user equipment has selected to utilize, etc. For example, a first resolution map 322 at the first resolution 304 may be selected for first user equipment 330 within the location 320 based upon various factors such as user equipment speed and/or radio frequency used by the first user equipment 330. Radio frequency propagation conditions and characteristics described by the first resolution map 322 may be applied to the first user equipment 330 during a simulation. A second resolution map 324 at the second resolution 306 may be selected for second user equipment 332 within the location 320 based upon various factors such as user equipment speed and/or radio frequency used by the second user equipment 332. Radio frequency propagation conditions and characteristics described by the second resolution map 324 may be applied to the second user equipment 332 during a simulation. A third resolution map 326 at the third resolution 308 may be selected for third user equipment 334 within the location 320 based upon various factors such as user equipment speed and/or radio frequency used by the third user equipment 334. Radio frequency propagation conditions and characteristics described by the third resolution map 326 may be applied to the third user equipment 334 during the simulation.

FIG. 4A illustrates a simulation manager component 414 managing a simulation 402 of a wireless network. The simulation 402 may emulate a first cell site 409, a second cell site 408, emulated user equipment 403 being carried by a pedestrian in a city, trees 406, buildings 403, and/or various types of network components. In some embodiments, network components and/or user equipment may be emulated (virtual) devices, or physical devices coupled to the simulation 402 (e.g., connected to one or more computing devices running the simulation 402), but are considered wireless as part of the simulation 402. The simulation manager component 414 may maintain a plurality of resolution maps 416 that may be applied to the simulation 402 in order to apply certain radio frequency propagation conditions and constraints to the simulation 402.

In some embodiments, each resolution map of the plurality of resolution maps 416 represents a fixed radio frequency condition given a region (one or more grid locations) within a location being simulated by the simulation 402 of the wireless network. That is, a first resolution map may represent a first radio frequency for the region, and may be selected when the emulated user equipment 403 will use the first radio frequency. A second resolution map may represent a second radio frequency for the region, and may be selected when the emulated user equipment 403 will use the second radio frequency.

In some embodiments, a first resolution map corresponds to a first radio frequency and a first region size (the first resolution 304) and a second resolution map corresponds to a second radio frequency and a second region size (the second resolution 306). If the first radio frequency has a lower frequency than the second radio frequency, then the first region size (the first resolution 304) will be larger than the second region size (the second resolution 306). That is, the lower the radio frequency associated with a resolution map, the larger the region size (resolution) of the resolution map.

In some embodiments, a resolution map for a region describes radio frequency signals from one or more cell sites that are deployed within the region and neighboring regions proximate the region such that signals from these neighboring cell sites can be received within the region. In this way, the resolution map for the region may take into account the neighboring cell sites within neighboring regions because signals from the neighboring cell sites can be received by user equipment within the region.

In some embodiments, each resolution map of the plurality of resolution maps 416 corresponds to a different user equipment speed, and the plurality of resolution maps 416 correspond to the same fixed radio frequency. For example, a first resolution map may be applied for user equipment traveling from 0 to 6 miles per hour, a second resolution map may be applied for user equipment traveling 6 to 40 miles per hour, a third resolution map may be applied for user equipment traveling greater than 40 miles per hour.

In some embodiments, a first resolution map corresponds to a first user equipment speed (e.g., 0 to 20 miles per hour) and a first region size (the first resolution 304). A second resolution map corresponds to a second user equipment speed (e.g., 20 miles per hour to 80 miles to per) and a second region size (a second resolution 306). If the first user equipment speed is larger than the second user equipment speed, then the first region size (the first resolution 304) will be larger than the second region size (the second resolution 306). That is, the fast the user equipment speed associated with a resolution map, the larger the region size (resolution) of the resolution map.

In some embodiments, a first resolution map may be assigned a primary map type. A second resolution map may be assigned a secondary map type. The first resolution map and the second resolution map may utilize a same radio access network (RAN). However, the first resolution map and the second resolution map may correspond to different user equipment speeds and/or different radio frequencies. In some embodiments, primary map types and secondary map types are used to distinguish between resolution maps for a same region/cell but at different resolutions (different radio frequencies or user equipment speeds). This helps the system understand that these maps describe a same region/cell and that the emulated user equipment can utilize any of these maps depending on current conditions/factors while maintaining connectivity to the same region/cell. In some embodiments, the primary map type and the second map type help the emulated user equipment identify unique regions/cells. If a region/cell is not unique, then there will be one resolution map having the primary map type and other resolution maps will have the secondary map type. The resolution map with the primary map type will be used as a default resolution map, and the resolution map with the secondary map type are used on an as needed basis based upon device speed and radio frequency.

During the simulation 402 of the wireless network, the simulation manager component 414 may obtain various information 410 associated with the emulated user equipment 403 being carried by the pedestrian while walking through the city. In some embodiments, the information 410 may relate to a user equipment speed of the emulated user equipment 403. For example, the pedestrian may be walking with the user equipment speed at 1 mile per hour. In some embodiments, the information 410 may relate to a radio frequency that the emulated user equipment 403 has determined to use when communicating with a cell cite. For example, the radio frequency may have been negotiated between the emulated user equipment 403 and an emulated distributed unit. In some embodiments, the information 410 may relate to location information of the emulated user equipment 403 moving around during the simulation 402 of the wireless network. For example, movement of the emulated user equipment 403 may be tracked during the simulation 402 of the wireless network. The movement of the emulated user equipment 403 may be used to select and apply certain resolution maps as the emulated user equipment 403 moves in order to implement gradual radio frequency condition changes. For example, a resolution map 326 may be utilized while a user is walking with an emulated user equipment. The user may change a mode of transportation such as by getting into a vehicle. As the speed of the vehicle, and thus the emulated user equipment, increases, the resolution map 324 may be utilized. As the vehicle, and thus the emulated user equipment, approaches highway speed, the resolution map 322 may be utilized. These resolution maps may describe the relationship (radio frequency propagation) with a same emulated distributed unit (DU), which allows the simulation to use the least amount of data at any given point in time while still obtaining an accurate result.

Once the simulation manager component 414 has obtained the information 410 related to the emulated user equipment 403 being simulated through the simulation 402 of the wireless network, the information 410 may be used to select a set of resolution maps 412 from the plurality of resolution maps 416 (e.g., a resolution map with a primary map type and/or a resolution map with a secondary map type), during operation 202 of method 200. In some embodiments, the set of resolution maps 412 may correspond to a geographical location of the emulated user equipment 403, and thus the set of resolution maps 412 comprise radio frequency propagation information for that geographical location. In some embodiments, the set of resolution maps 412 may correspond to a speed of the emulated user equipment 403, and thus the set of resolution maps 412 comprise radio frequency propagation information that would be experienced by (relevant to) user equipment moving at that speed. In some embodiments, the set of resolution maps 412 may correspond to a radio frequency that the emulated user equipment 403 has selected to use, and thus the set of resolution maps 412 comprise radio frequency propagation information that will be experienced by user equipment communicating at that radio frequency.

During operation 204 of method 200, the geographical location of the emulated user equipment 403 may be translated in a geographical map to a grid location in the set of resolution maps. In some embodiments, a resolution map may comprise a grid located within a region of the geographical map. The grid may comprise one or more grid locations in the region of the geographical map. Radio frequency propagation information and/or other information may be associated with each of the grid locations. Accordingly, the emulated user equipment 403 may be located at one of the grid locations in the resolution map at a given point in time. The grid location at which the emulated user equipment 403 is located may be associated with a cell list of cell sites whose signals reach that grid location, and thus may be candidate cell sites to which the emulated user equipment 403 may connect. The cell list may be derived from the radio frequency propagation characteristics of the set of resolution maps 412. Signal strengths of communication signals that the emulated user equipment 403 can receive while at the grid location may be derived from the radio frequency propagation characteristics of the set of resolution maps 412. The cell list and/or the signal strength may also be based upon a given radio frequency and/or the speed of the emulated user equipment 403.

During operation 206 of method 200, the simulation manager component 414 may provide the emulated user equipment 403 with the cell list at the grid location and the signal strengths derived from the set of resolution maps at a given radio frequency and speed of the emulated user equipment 403.

In some embodiments, a mapping file may be maintained. The mapping file may map cell identifiers of cell sites within the simulation 402 to radio frequency channel numbers. The mapping file may be used to filter the cell list to remove cell sites that are transmitting at a frequency below a threshold frequency. In some embodiments, the cell list may be filtered by the emulated user equipment 403 and/or an emulated distributed unit to remove cell sites that do not support a radio frequency that the emulated user equipment 403 and/or the emulated distributed unit have selected to utilize.

During operation 208 of method 200, the emulated user equipment 403 may utilize the cell list and the signal strengths to select and connect to a cell site within the cell list. In some embodiments, this information is used to determine a radio frequency value per cell, and the simulation may compute radio frequency interference values based upon the radio frequency values and/or other information. The cell site may be selected based upon the cell site having a threshold signal strength, supporting a particular radio frequency, and/or other selection criteria. In some embodiments, a signal to interference and noise ratio may be computed based upon radio frequency propagation characteristics within the set of resolution maps 412. The cell site may be selected based upon the signal to interference and noise ratio, such as where the sell site has a signal to interference and noise ratio below a threshold or a lowest signal to interference and noise ratio.

In some embodiments, the simulation manager component 414 may generate a simulation result based upon the cell site to which the emulated user equipment 404 is connected and/or from other information tracked during the simulation 402. The simulation result may correspond to signal strength, interference experienced, a radio frequency being used, device travel speed, and/or other characteristics derived from the emulated user equipment 404 communicating with the cell site.

In some embodiments, the simulation result may be used to generate and transmit a command over the actual physical wireless network (as opposed to the simulation 402 of the wireless network) to user equipment operating within the wireless network in the real-world. The command may comprise a recommendation for the user equipment to implement during real-world operation, such as a radio frequency to utilize, a cell site to connect to, etc. In some embodiments, the simulation result may be used to modify operation of the user equipment operating within the wireless network such as to cause the user equipment to switch radio frequencies. In some embodiments, the simulation result may be used to generate and transmit a radio frequency recommendation to the user equipment to utilize based upon the simulation result. In some embodiments, the simulation result may be used to generate and transmit a recommendation, specifying radio frequencies to use for ranges of user equipment speeds, to the user equipment. In this way, real-world operation of the user equipment may be modified based upon the simulation result in order to improve the operation of the user equipment. For example, the user equipment may be provided with a recommendation of a radio frequency that will provide optimal performance, a performance point at which the user equipment is to switch radio frequencies because the user equipment will no longer benefit from a current radio frequency (e.g., the user equipment could switch to a different radio frequency that will conserve power consumption), etc.

FIG. 4B illustrates the simulation manager component 414 tracking movement of the emulated user equipment 403 as the emulated user equipment 403 moves around during the simulation 402 of the wireless network. As the emulated user equipment 403 moves, the simulation manager component 414 may obtain updated information 430 relating to the speed of the emulated user equipment 403, the radio frequency being used by the emulated user equipment 403, and/or location information of the emulated user equipment 403. The simulation manager component 414 may utilize the updated information 430 to select an updated set of resolution maps 432 that the simulation manager component 414 provides to the emulated user equipment 403. The emulated user equipment 403 may use the updated set of resolution maps 432 to select a particular cell site to connect to during the simulation 402. The simulation manager component 414 may generate a simulation result based upon the simulation 402. The simulation manager component 414 may utilize the simulation result to generate a command 440 to transmit to user equipment 442 operating in the real-world in order to modify operation of the user equipment 442, such as to cause the user equipment to switch to a particular radio frequency or connect to a particular cell site.

FIGS. 5A and 5B illustrate a simulation 502 of a wireless network. The simulation 502 may correspond to a location including trees 510, buildings 504, a first cell site 506, a second cell site 508, emulated user equipment 501 traveling within a vehicle along a highway, etc. A simulation manager component 514 may be configured to obtain information 512 related to the emulated user equipment 501 operating during the simulation 502. The information 512 may relate to a speed of the emulated user equipment 501 (e.g., 65 miles per hour), a radio frequency being used by the emulated user equipment 501, location information of the emulated user equipment 501, etc. The simulation manager component 514 may utilize the information 512 to select a set of resolution maps 518 from a plurality of resolution maps 516. In some embodiments, the set of resolution maps 518 may be selected based upon a selection criteria relating to the speed of the emulated user equipment 501 traveling at 65 miles per hour. In some embodiments, if the emulated user equipment 501 was traveling at a different speed (e.g., the emulated user equipment 403 of FIGS. 4A and 4B traveling at 1 mile per hour), then different resolution maps may be selected. The set of resolution maps 518 may be provided to the emulated user equipment 501, which may use the set of resolution maps 518 to select a cell site to connect to during the simulation 502.

FIG. 5B illustrates the simulation manager component 514 tracking movement of the emulated user equipment 501 as the emulated user equipment 501 moves around during the simulation 502 of the wireless network. As the emulated user equipment 501 moves (e.g., the emulated user equipment 501 travels along the highway), the simulation manager component 514 may obtain updated information 530 relating to the speed of the emulated user equipment 501, the radio frequency being used by the emulated user equipment 501, and/or location information of the emulated user equipment 501. The simulation manager component 514 may utilize the updated information 530 to select an updated set of resolution maps 532 that the simulation manager component 514 provides to the emulated user equipment 501. The emulated user equipment 501 may use the updated set of resolution maps 532 to select a particular cell site to connect to during the simulation 502. The simulation manager component 514 may generate a simulation result based upon the simulation 502. The simulation manager component 514 may utilize the simulation result to generate and transmit a command 540 to user equipment 542 operating in the real-world in order to modify operation of the user equipment 542, such as to cause the user equipment to switch to a particular radio frequency or connect to a particular cell site.

In some embodiments, a resolution map may be implemented as a channel condition lookup table, an example of which is specified in the below table:

| Field | Comments |
|---|---|
| Table Name | Table name |
| NW Coordinates | The absolute coordinates of the North West corner of the map (Top left) |
| SW Coordinates | The absolute coordinates of the South West corner of the map (Bottom left) |
| NE Coordinates | The absolute coordinates of the North East corner of the map (Top Right) |
| SE Coordinates | The absolute coordinates of the South East corner of the map (Bottom Right) |
| Grid Size | Size of the grid element in meters (assume a square grid) |
| GridMinSpeed | Min Speed at which the grid is calculated (should be set to zero to allow all speeds) |
| GridMaxSpeed | Max Speed at which the grid is calculated (should be set to zero to allow all speeds) |
| MapType | Primary: includes unique RAN ID, s<br>Secondary: include redundant RAN ID |
| SrcMap | In MapType = Primary, this value is NULL, if MapType = Secondary, this string value includes the name of the Primary Map |
| RAN ID | RAN ID:<br>CU ID as the upper 18 bits<br>DU ID as the next 8 bits<br>lower 6 bits in this value should be all 0 as they represent the Local Cell ID defined below |
| DU Location X | The absolute X coordinates of the DU |
| DU Location Y | The absolute Y coordinates of the DU |
| { | |
| Sector Carrier | Sector name |
| Sector start angle | The start angel of the sector (if Omni 0) |
| Sector end angle | The end angel of this sector (if Omni 360) |
| Local Cell ID | Only 6 bit value: only the lower 4 bits are used currently.<br>These 6 bits will replace the lower 6 bits of the RAN ID |
| Frequency | The ARFCN of this sector |
| Sector BW | The bandwidth of this carrier in in 5 MHz increments |
| Mid Cell Radius | Radius in meters for the area considered to be mid cell |
| Far Cell Radius | Radius in meters for the area considered to be Far cell |
| } | End per DU |

In some embodiments, an example of a description for a cell site is as follows:

| Field | Variable | Comments |
|---|---|---|
| Grid Center Location X | | The absolute X coordinates of the center of this grid location |
| Grid Center Location Y | | The absolute Y coordinates of the center of this grid location |
| For all RAN | | |
| | { | |
| | Local Cell ID | Sector ID which is an augmentation of the Local Cell ID replacing the lowest 6 bits of the DU ID. |
| | E2Egain | Gain in DB (align word length with the above value) |
| | } | Repeat for all sector carriers of this DU |
| Repeat for all RAN | | |

According to some embodiments, a method may be provided. The method includes selecting a set of resolution maps from a plurality of resolution maps based on a speed of travel of an emulated user equipment, modeled in a simulation of a wireless network. The method includes translating a geographical location of the emulated user equipment in a geographical map to a grid location in the set of resolution maps. The method includes providing the emulated user equipment with a cell list at the grid location and signal strengths derived from the set of resolution maps at a given radio frequency and the speed. The method includes utilizing the cell list and the signal strengths to at least one of select and connect the emulated user equipment to a cell site within the cell list or determine radio frequency values used by the simulation to determine radio frequency interference.

According to some embodiments, the method includes maintaining a mapping file (or in a database) to map cell identifiers of cell sites within the simulation to radio frequency channel numbers; and utilizing the mapping file to filter the cell list to remove cell sites that are transmitting at a frequency below a threshold frequency.

According to some embodiments, the method includes simulating multiple different frequency scenarios simultaneously during the simulation.

According to some embodiments, the method includes filtering, by the emulated user equipment and an emulated distributed unit, the cell list to remove cell sites based upon a frequency the emulated user equipment and the emulated distributed unit have selected to utilize.

According to some embodiments, the method includes computing a signal to interference and noise ratio based upon radio frequency propagation characteristics within the set of resolution maps; and selecting the cell site based upon the signal to interference and noise ratio.

According to some embodiments, each resolution map represents a fixed radio frequency condition at a given region.

According to some embodiments, a resolution map for a region describes radio frequency signals from a plurality of cell sites that are deployed within the region and proximate the region.

According to some embodiments, the set of resolution maps correspond to a fix radio frequency, and where each resolution map corresponds to a different user equipment speed.

According to some embodiments, a first resolution map corresponds to a first user equipment speed and a first region size and a second resolution map corresponds to a second user equipment speed and a second region size, wherein the first region size is larger than the second region size based upon the first user equipment speed being larger than the second user equipment speed.

According to some embodiments, the set of resolution maps correspond to different radio frequencies.

According to some embodiments, a first resolution map corresponds to a first radio frequency and a first region size and a second resolution map corresponds to a second radio frequency and a second region size, wherein the first region size is larger than the second region size based upon the first radio frequency having a lower frequency than the second radio frequency.

According to some embodiments, a device is provided. The device comprises a processor. The processor is configured to execute instructions to facilitate performance of operations comprising selecting a set of resolution maps from a plurality of resolution maps based on one or more radio frequencies used by an emulated user equipment during a simulation of a wireless network; translating a geographical location of the emulated user equipment in a geographical map to a grid location in the set of resolution maps; providing the emulated user equipment with a cell list at the grid location and signal strengths derived from the set of resolution maps at a given radio frequency and the speed; and utilizing the cell list and the signal strengths to at least one of select and connect the emulated user equipment to a cell site within the cell list or determine radio frequency values used by the simulation to determine radio frequency interference.

According to some embodiments, the operations include generating a simulation result based upon the cell site to which the emulated user equipment is connected; and generating and transmitting a command to user equipment operating within the wireless network with a recommendation based upon the simulation result.

According to some embodiments, the operations include generating a simulation result based upon the cell site to which the emulated user equipment is connected; and modifying operation of user equipment operating within the wireless network based upon the simulation result.

According to some embodiments, the operations include generating a simulation result based upon the cell site to which the emulated user equipment is connected; and transmitting a radio frequency recommendation to user equipment operating within the wireless network based upon the simulation result.

According to some embodiments, the operations include generating a simulation result based upon the cell site to which the emulated user equipment is connected; and transmitting a recommendation to user equipment operating within the wireless network based upon the simulation result, wherein the recommendation specifies radio frequencies to use for ranges of user equipment speeds.

According to some embodiments, a non-transitory computer-readable medium storing instructions that when executed facilitate performance of operations, is provided. The operations include selecting a set of resolution maps from a plurality of resolution maps based on one or more radio frequencies used by an emulated user equipment during a simulation of a wireless network and a speed of the emulated user equipment; translating a geographical location of the emulated user equipment in a geographical map to a grid location in the set of resolution maps; providing the emulated user equipment with a cell list at the grid location and signal strengths derived from the set of resolution maps at a given radio frequency and the speed; and utilizing the cell list and the signal strengths to at least one of select and connect the emulated user equipment to a cell site within the cell list or determine radio frequency values used by the simulation to determine radio frequency interference.

According to some embodiments, a first resolution map overlaps a second resolution map, and wherein information within the first resolution map is maintained separate from information within the second resolution map.

According to some embodiments, a first resolution map has a primary map type and a second resolution map has a secondary map type, wherein the first resolution map and the second resolution map utilize a same radio access network (RAN), and wherein the first resolution map and the second resolution map correspond to different user equipment speeds or different radio frequencies.

According to some embodiments, the operations include tracking movement of the emulated user equipment during the simulation; and selecting resolution maps as the emulated user equipment moves in order to implement gradual radio frequency condition changes.

Figure 6:
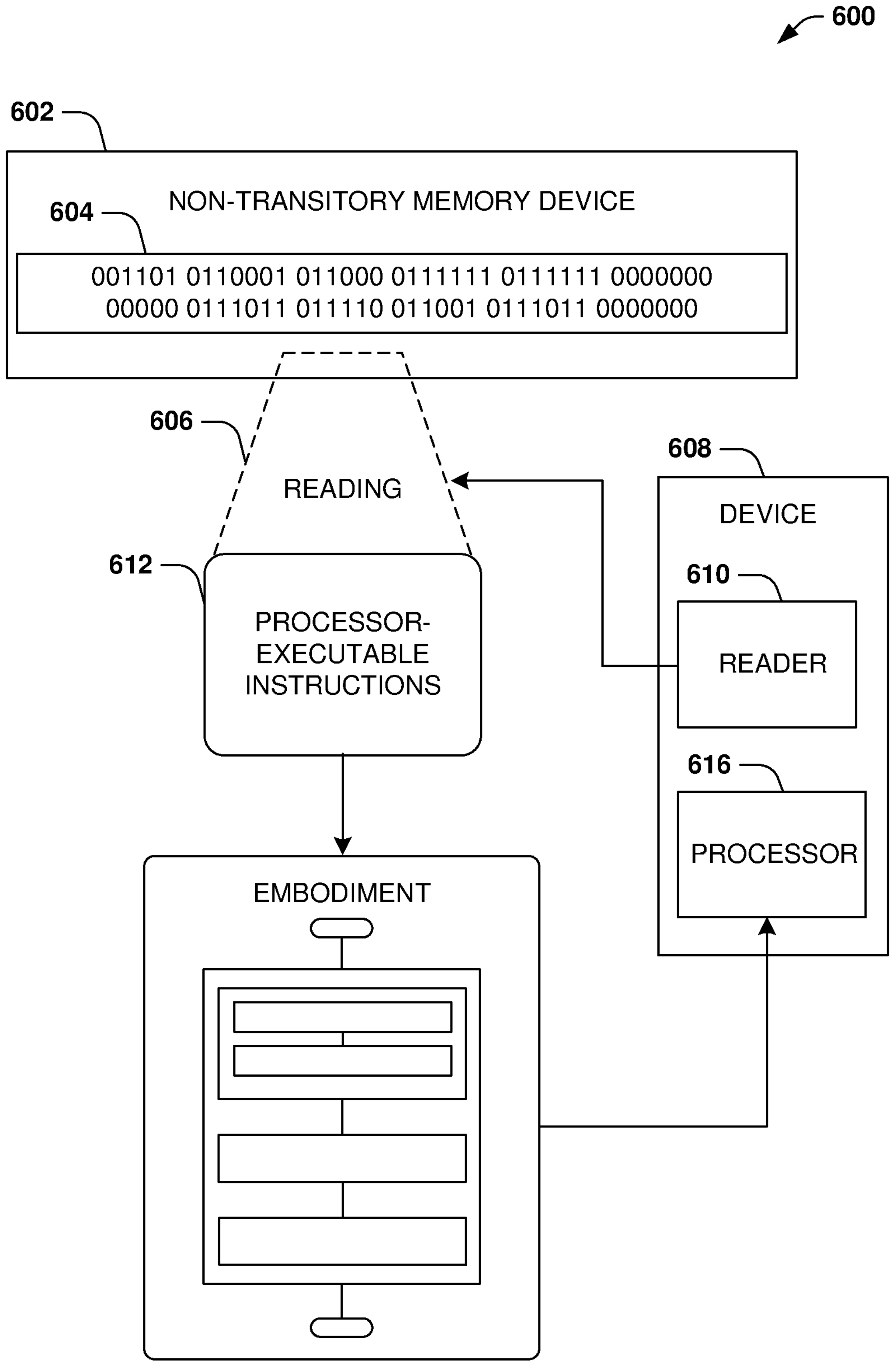
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of the example system 300 of FIG. 3, at least some of the example system 400 of FIGS. 4A and 4B, and/or at least some of the example system 500 of FIGS. 5A and 5B.

Figure 7:
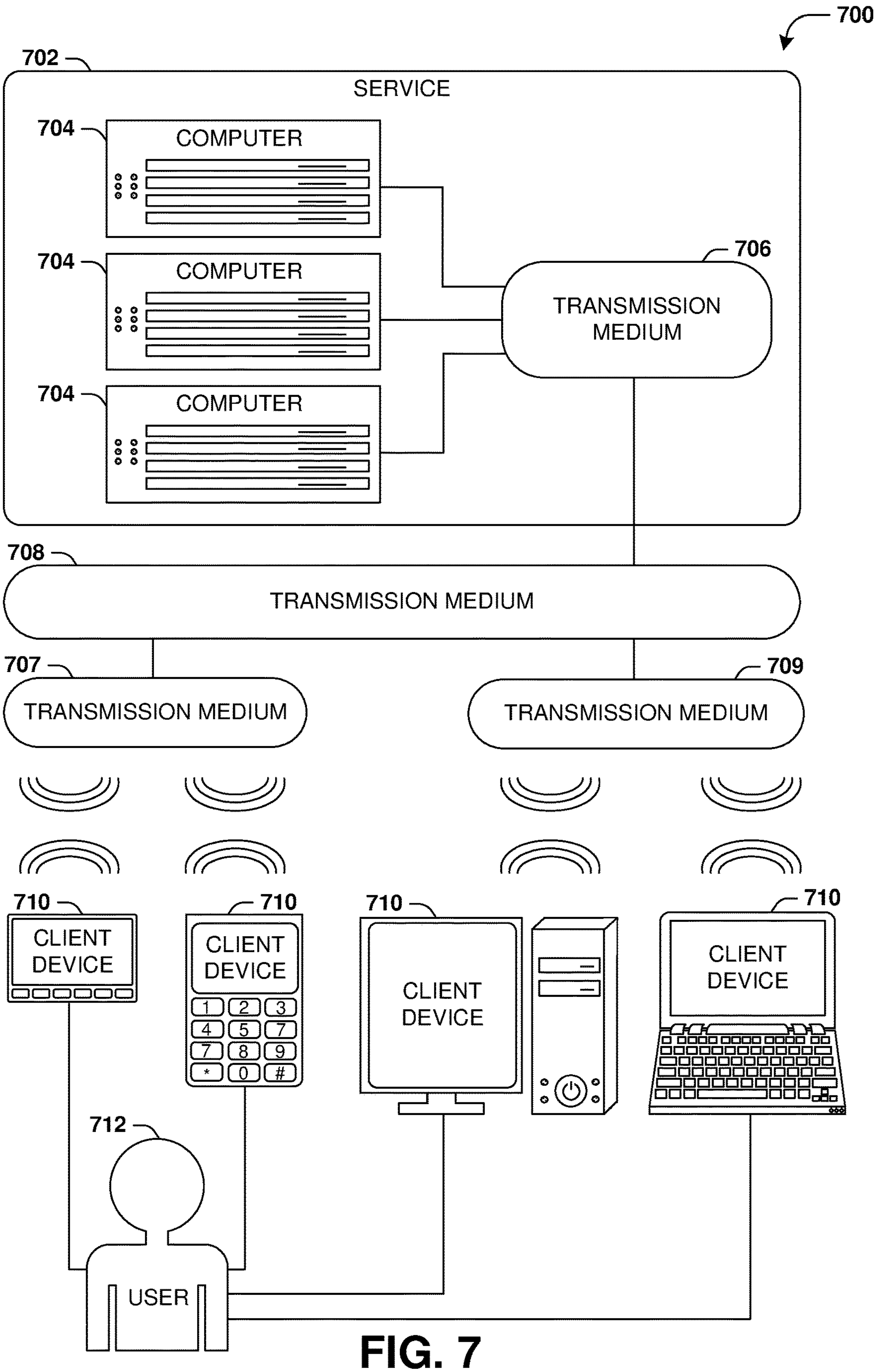
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figure 8:
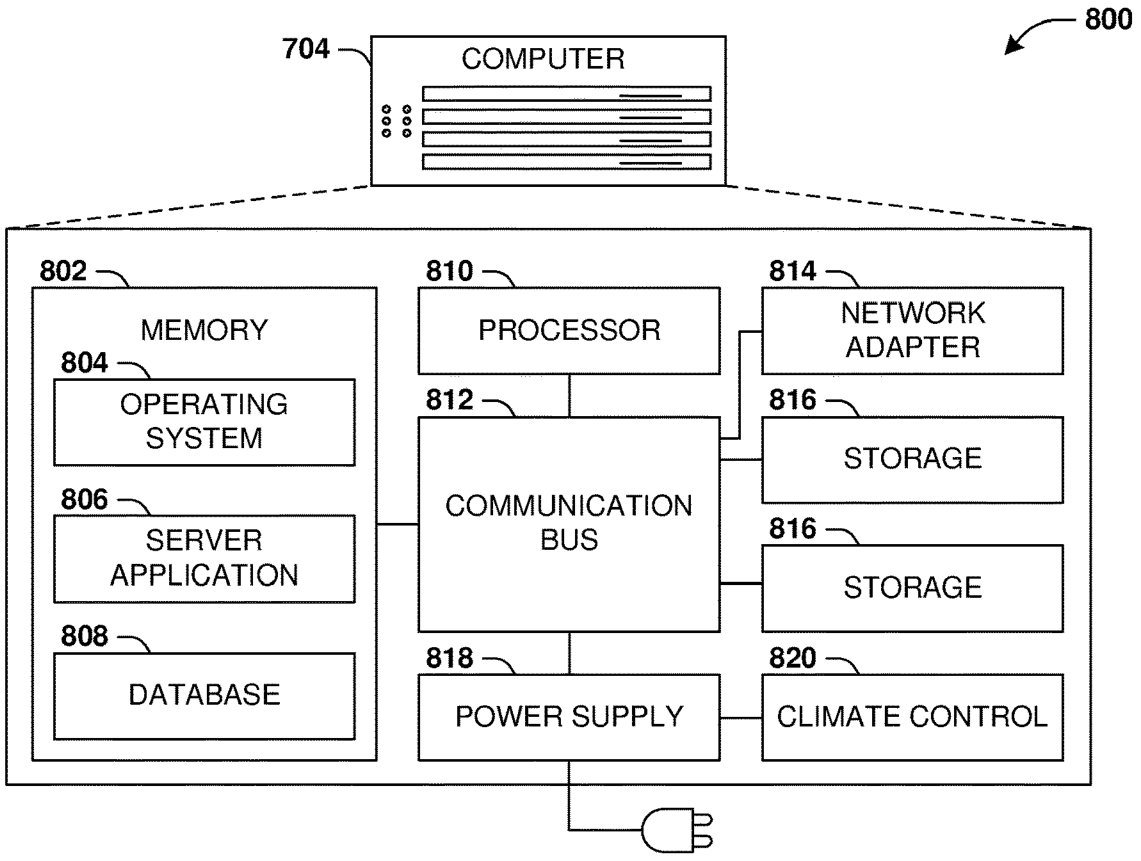
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

Figure 9:
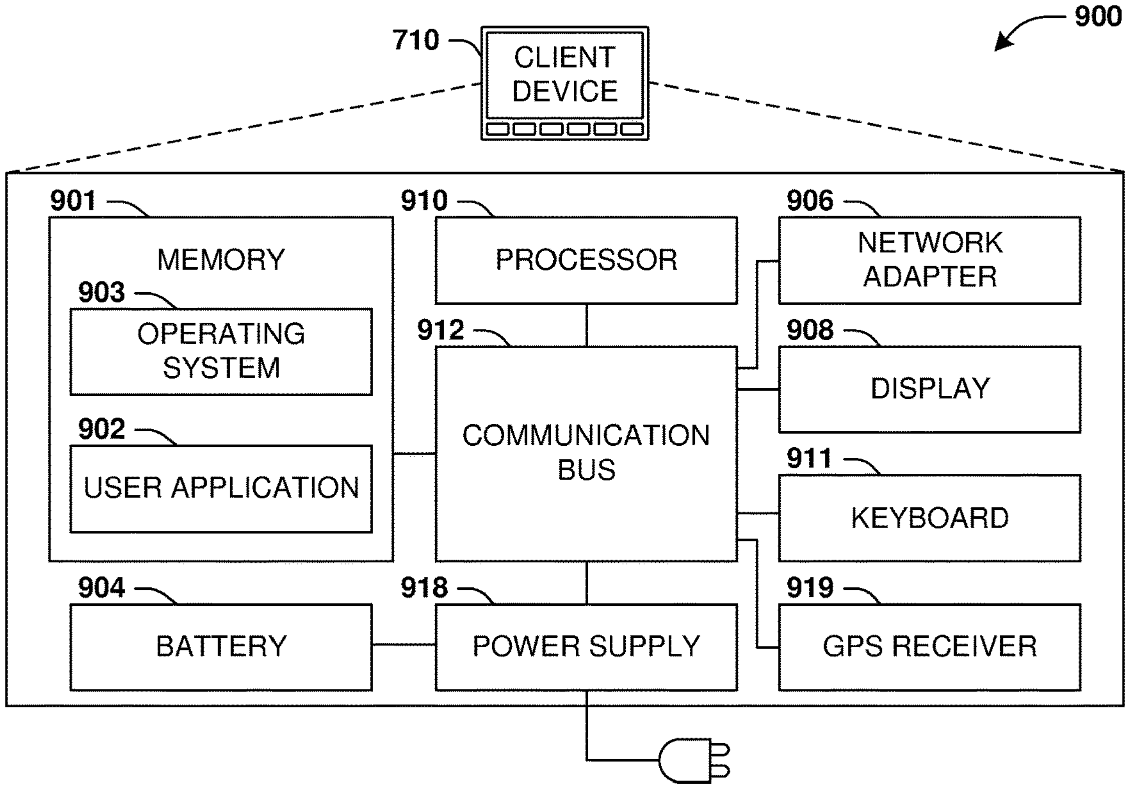
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed:

1. A method, comprising:

determining a simulation of a wireless network, including an emulated user equipment, using a plurality of resolution maps each corresponding to a user speed range;

dynamically switching from a first set of resolution maps of the plurality of resolution maps to a second set of resolution maps of the plurality of resolution maps based upon a speed of travel of the emulated user equipment in the simulation, wherein a set of resolution maps, of the plurality of resolution maps, having a first region size is applied at lower speeds and a set of resolution maps, of the plurality of resolution maps, having a second region size is applied at higher speeds;

after the switch to the second set of resolution maps from the plurality of resolution maps, translating a geographical location of the emulated user equipment in a geographical map to a grid location in the second set of resolution maps;

after the translation of the geographical location of the emulated user equipment to the grid location in the second set of resolution maps, providing the emulated user equipment with both (i) a cell list at the grid location to which the geographical location of the emulated user equipment was translated in the second set of resolution maps and (ii) signal strengths derived from the second set of resolution maps at a given radio frequency and the speed; and utilizing the cell list and the signal strengths to at least one of select and connect the emulated user equipment to a cell site within the cell list or determine radio frequency values used by the simulation to determine radio frequency interference.

2. The method of claim 1, comprising:

maintaining a mapping file to map cell identifiers of cell sites within the simulation to radio frequency channel numbers; and utilizing the mapping file to filter the cell list to remove cell sites that are transmitting at a frequency below a threshold frequency.

3. The method of claim 1, comprising:

implementing at least one of the plurality of resolution maps as a channel condition lookup table.

4. The method of claim 1, comprising:

filtering, by the emulated user equipment and an emulated distributed unit, the cell list to remove cell sites based upon a frequency the emulated user equipment and the emulated distributed unit have selected to utilize.

5. The method of claim 1, comprising:

computing a signal to interference and noise ratio based upon radio frequency propagation characteristics within the second set of resolution maps; and selecting the cell site based upon the signal to interference and noise ratio.

6. The method of claim 1, wherein the first set of resolution maps has the first region size and the second set of resolution maps has the second region size.

7. The method of claim 1, wherein a resolution map for a region describes radio frequency signals from a plurality of cell sites that are deployed within the region and proximate the region.

8. The method of claim 1, wherein the first set of resolution maps has the second region size and the second set of resolution maps has the first region size.

9. The method of claim 1, wherein the first region size is smaller than the second region size.

10. The method of claim 1, wherein the second set of resolution maps correspond to different radio frequencies.

11. The method of claim 10, wherein a first resolution map corresponds to a first radio frequency and a first region size and a second resolution map corresponds to a second radio frequency and a second region size, wherein the first region size is larger than the second region size based upon the first radio frequency having a lower frequency than the second radio frequency.

12. A computing device comprising:

a processor configured to execute instructions to facilitate performance of operations comprising:

determining a simulation of a wireless network, including an emulated user equipment, using a plurality of resolution maps, wherein at least one of the plurality of resolution maps is implemented as a channel condition lookup table;

dynamically switching from a first set of resolution maps of the plurality of resolution maps to a second set of resolution maps of the plurality of resolution maps based upon a speed of travel of the emulated user equipment in the simulation and one or more radio frequencies used by the emulated user equipment during the simulation, wherein a set of resolution maps, of the plurality of resolution maps, having a first region size is applied at lower speeds and a set of resolution maps, of the plurality of resolution maps, having a second region size is applied at higher speeds;

after the switch to the second set of resolution maps from the plurality of resolution maps, translating a geographical location of the emulated user equipment in a geographical map to a grid location in the second set of resolution maps;

after the translation of the geographical location of the emulated user equipment to the grid location in the second set of resolution maps, providing the emulated user equipment with both (i) a cell list at the grid location to which the geographical location of the emulated user equipment was translated in the second set of resolution maps and (ii) signal strengths derived from the second set of resolution maps at a given radio frequency and speed; and utilizing the cell list and the signal strengths to at least one of select and connect the emulated user equipment to a cell site within the cell list or determine radio frequency values used by the simulation to determine radio frequency interference.

13. The computing device of claim 12, wherein the operations comprise:

generating a simulation result based upon the cell site to which the emulated user equipment is connected; and generating and transmitting a command to user equipment operating within the wireless network with a recommendation based upon the simulation result.

14. The computing device of claim 12, wherein the operations comprise:

generating a simulation result based upon the cell site to which the emulated user equipment is connected; and modifying operation of user equipment operating within the wireless network based upon the simulation result.

15. The computing device of claim 12, wherein the operations comprise:

generating a simulation result based upon the cell site to which the emulated user equipment is connected; and transmitting a radio frequency recommendation to user equipment operating within the wireless network based upon the simulation result.

16. The computing device of claim 12, wherein the operations comprise:

generating a simulation result based upon the cell site to which the emulated user equipment is connected; and transmitting a recommendation to user equipment operating within the wireless network based upon the simulation result, wherein the recommendation specifies radio frequencies to use for ranges of user equipment speeds.

17. A non-transitory computer-readable medium storing instructions that when executed facilitate performance of operations comprising:

determining a simulation of a wireless network, including an emulated user equipment, using a plurality of resolution maps each corresponding to a user speed range;

dynamically switching from a first set of resolution maps of the plurality of resolution maps to a second set of resolution maps of the plurality of resolution maps based upon one or more radio frequencies used by the emulated user equipment during the simulation and a speed of the emulated user equipment, wherein a set of resolution maps, of the plurality of resolution maps, having a first region size is applied at lower speeds and a set of resolution maps, of the plurality of resolution maps, having a second region size is applied at higher speeds;

after the switch to the second set of resolution maps from the plurality of resolution maps, translating a geographical location of the emulated user equipment in a geographical map to a grid location in the second set of resolution maps;

after the translation of the geographical location of the emulated user equipment to the grid location in the second set of resolution maps, providing the emulated user equipment with both (i) a cell list at the grid location to which the geographical location of the emulated user equipment was translated in the second set of resolution maps and (ii) signal strengths derived from the second set of resolution maps at a given radio frequency and the speed; and utilizing the cell list and the signal strengths to at least one of select and connect the emulated user equipment to a cell site within the cell list or determine radio frequency values used by the simulation to determine radio frequency interference.

18. The non-transitory computer-readable medium of claim 17, wherein a first resolution map overlaps a second resolution map, and wherein information within the first resolution map is maintained separate from information within the second resolution map.

19. The non-transitory computer-readable medium of claim 17, wherein a first resolution map has a primary map type and a second resolution map has a secondary map type, wherein the first resolution map and the second resolution map utilize a same radio access network (RAN), and wherein the first resolution map and the second resolution map correspond to different user equipment speeds or different radio frequencies.

20. The non-transitory computer-readable medium of claim 17, wherein the operations comprise:

tracking movement of the emulated user equipment during the simulation; and selecting resolution maps as the emulated user equipment moves in order to implement gradual radio frequency condition changes.

* * * * *